April 9, 1968
J. L. FITCH ET AL
3,376,941
METHOD AND APPARATUS FOR RECORDATION OF THE
ORIENTATION OF TOOLS IN REMOTE LOCATIONS
Filed Feb. 23, 1966
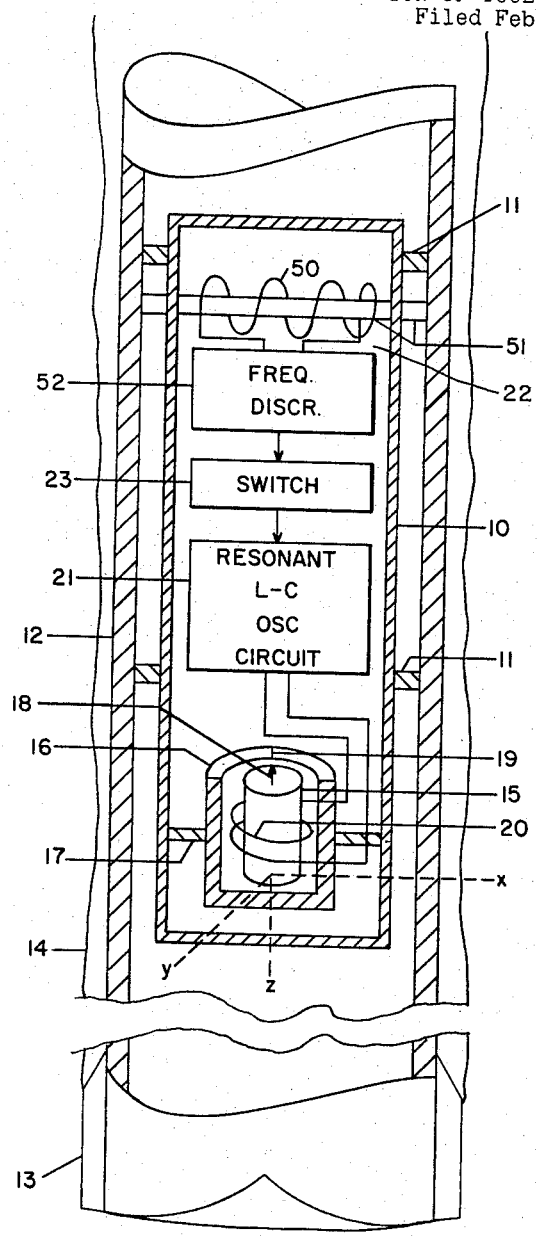
FIG. 1
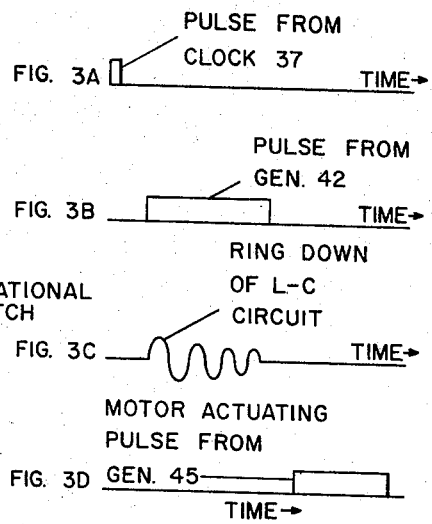
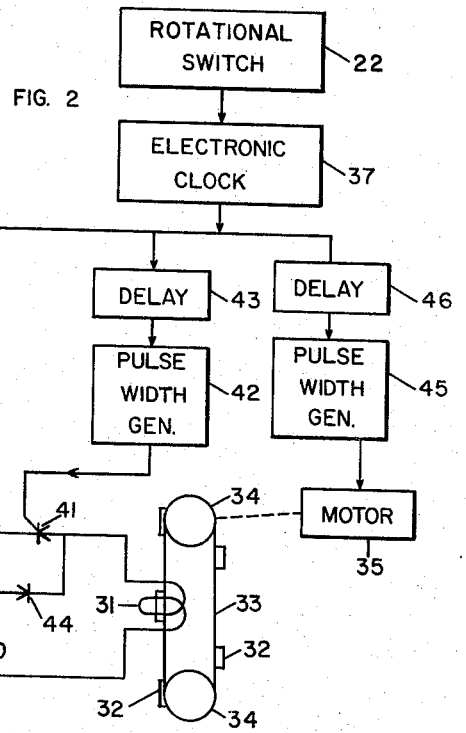
INVENTORS:
JOHN L. FITCH
BOBBIE J. PATTON
ATTORNEY:

United States Patent Office 3,376,941
Patented Apr. 9, 1968

3,376,941
METHOD AND APPARATUS FOR RECORDATION OF THE ORIENTATION OF TOOLS IN REMOTE LOCATIONS
John L. Fitch and Bobbie J. Patton, Dallas, Tex., assignors to Mobil Oil Corporation, a corporation of New York
Filed Feb. 23, 1966, Ser. No. 529,357
9 Claims. (Cl. 175—44)

ABSTRACT OF THE DISCLOSURE

The specification discloses a technique of and arrangement for recording the orientation of remote tools by imparting remanent magnetism to a synthetic sample of magnetic material located in the tool in a known alignment. The magnetism imparted to the sample may be anhysteretic or thermal remanent magnetism aligned in the direction of the earth's magnetic field. The preferred use of the invention is for borehole tool orientation purposes.

---

This invention relates to a method and system for recording the orientation of tools in remote locations such as in boreholes by imparting remanent magnetism to a synthetic sample located in the tool in a known alignment.

One well-known system for determining the orientation or inclination of borehole tools involves the use of photographic equipment to photograph simultaneously the position of a plumb bob and of a magnetic or gyrocompass at a desired depth. Systems of this type have disadvantages in that the borehole tool must be held stationary for each measurement and further have limitations with respect to maximum operating temperatures.

In accordance with the present invention, there is provided a unique technique and system for recording the orientation of remotely operated tools and which have advantages over conventional techniques and systems. The system comprises the combination of a synthetic magnetic sample located in a closed section of the tool in a known alignment and means for imparting remanent magnetism (aligned in the direction of the earth's field) to the sample while the tool is located in a remote location, such as in a borehole.

In carrying out the method of the present invention in borehole applications, the synthetic sample is located in a borehole tool in a known alignment prior to the insertion thereof in the borehole. The tool then is inserted into the borehole to carry out desired operations and while located therein remanent magnetism is imparted to the sample. Upon removal of the tool from the borehole, measurements are made on the sample to determine the direction of the remanent magnetism imparted thereto to obtain an indication of the orientation or inclination of the tool while in the borehole.

In one embodiment, anhysteretic remanent magnetism is imparted to the sample for orientation purposes. This embodiment has advantages since the orientation technique thereof can be carried out while the tool is in motion.

For further objects and advantages of the present invention, and for a more complete description thereof, reference may now be had to the following description taken in conjunction with the accompanying drawings in which:

FIGURE 1 illustrates the orientation system of the present invention employed in a borehole tool;

FIGURE 2 illustrates a modification of the orientation system of FIGURE 1 and circuitry of the modified system; and FIGURES 3A-3D are time diagrams useful in understanding the system of FIGURE 2.

Referring now to FIGURE 1, the tool orientation system of the present invention is shown located in a sealed container 10 secured by supports 11 to the interior of a rotatable drill pipe casing 12. The casing 12 is rotated by a surface power means (not shown) and further has a drill bit 13 coupled to the lower end thereof for drilling in borehole 14. The orientation system is employed for recording the inclination and azimuth orientation of the casing 12 while drilling is being carried out.

The orientation system comprises a synthetic sample 15 of magnetic material secured in a housing 16 in a known alignment therewith. The housing 16 is secured to the sealed container 10 by supports 17. A mark 18 placed on the sample 15 permits azimuthal alignment with a matching mark 19 placed on the edge of the housing 16.

In the embodiment now to be disclosed, anhysteretic remanent magnetism is imparted to the sample 15 for orientation purposes. This is carried out with an arrangement comprising an electrical coil 20 employed around the synthetic sample 15. The coil 20 forms part of a resonant L-C oscillating circuit 21 which is energized at a known time and depth and then allowed to decay or ring down. The coil 20 thus is energized with a decaying and alternating current. An alternating magnetic field is produced by the coil and imposed on the sample 15 in the presence of the earth's steady magnetic field. Upon the decay or ring down of the resonant circuit and hence of the alternating magnetic field, the magnetic sample takes on anhysteretic remanent magnetism which is aligned in the direction of the earth's magnetic field.

The anhysteretic remanent magnetism is imparted to the sample within a short period of time, for example, within about $\frac{1}{100}$ of a second or less. Thus, the drill pipe casing has time to move only a small angular distance during the magnetization process. With the aid of the alignment marks 18 and 19 and with other known parameters, the azimuth orientation as well as inclination of the casing may be determined at the time the sample 15 acquires anhysteretic remanent magnetism. This is done by subsequent measurements carried out on the sample 15 upon removal thereof from the casing 12.

For example, the direction of the anhysteretic remanent magnetism imparted to the sample in the $x$–$y$ plane (illustrated by dotted lines in FIGURE 1) with respect to marks 18 and 19 can be determined by measurements carried out wtih a suitable magnetometer such as with a spinner-type or flux-gate magnetometer. In the spinner-type magnetometer, the magnitude and direction of the anhysteretic remanent magnetization component imparted to the sample 15 in the $x$–$y$ plane may be determined by spinning the sample about the $z$ axis. The direction of this component is the same as the direction of the earth's magnetic field horizontal component which is known also by measurement. Further, the L-C circuit 21 is actuated at a known time and at a measurable depth by a controlled switching circuit. Thus, sufficient information is available to determine the azimuth orientation of the casing at the time and depth the sample 15 acquires anhysteretic remanent magnetization.

In order to determine the inclination of the casing 12, the sample 15 may be spun, for example, about its $x$ axis to determine the magnitude and direction of the anhysteretic remanent magnetic component in the $y$–$z$ plane. Sufficient information thus is available to determine the total anhysteretic remanent magnetism as well as its direction. Knowing this information, as well as the other parameters such as the direction of the earth's total magnetic field, the inclination of the casing then is determinable.

The system described above is employed for a single orientation measurement. Energization of the L-C circuit is initiated by a rotational switch 22, to be described hereinafter, which produces a control signal upon rotation of the drill pipe casing. This signal triggers a switch 23 which switches the capacitor of the L-C circuit across a battery for charging and then across the coil 20 for producing the alternating and decaying magnetic field.

Referring now to FIGURE 2, there will be described a system utilizing a plurality of samples for obtaining a plurality of orientation measurements at spaced times and hence at different depths. This system also employs an L-C resonant circuit and a capacitor switching system for producing an alternating and decaying magnetic field. The L-C resonant circuit comprises capacitor 30 and coil 31. In addition, there is provided a plurality of synthetic samples 32 attached, at equally spaced intervals, to a flexible belt 33 mounted on rollers 34. The belt 33 periodically is moved by rollers 34, driven by motor 35, sequentially to position the samples 32 adjacent coil 31.

In the operation of the system, the capacitor 30 periodically is switched across a battery 36 and then across the coil 31 by the capacitor switching system controlled by an electronic clock 37. The L-C circuit thus is charged and then allowed to ring down in the familiar transient fashion whereby an alternating and decaying magnetic field is produced by the coil 31. This field is imposed on an adjacent sample to impart anhysteretic remanent magnetism thereto. The output of the electronic clock 37 then is applied to actuate motor 35 to move another sample 32 adjacent the coil 31. At a later time and at another depth, switching of the capacitor 30 is again carried out to impart anhysteretic remanent magnetism to the new sample. Anhysteretic remanent magnetism thus is imparted sequentially to different samples 32 at different depths. Upon removal of the casing 12 from the borehole, measurements are carried out with respect to each sample to determine the direction of anhysteretic remanent magnetism. By knowing the times when anhysteretic remanent magnetism is imparted to each sample and the depth of the casing instrumentation at these times, one can then determine the orientation of the casing at each recording depth.

A more detailed description of the system of FIGURE 2 will now be given. Rotational switch 22 is activated when drilling operations begin for energizing clock 37. Electrical pulses are produced by clock 37 at known time intervals for controlling the capacitor switching system and motor 35. Clock 37 may comprise a plurality of bistable multivibrators forming a scaler actuated by an oscillator for the production of a single electrical pulse, for example, at hourly intervals.

FIGURE 3A illustrates an electrical pulse produced by the clock 37 forming the beginning of one cycle. This pulse is employed as a gate signal for triggering a silicon controlled rectifier 40 to switch the capacitor 30 across the battery 36. The capacitor 30 then is charged by battery 36 until sufficient reverse bias is formed by the capacitor 30 to turn off the silicon controlled rectifier 40. When this occurs, the capacitor 30 is allowed to discharge through coil 31 by way of silicon controlled rectifier 41 which is turned on by the output of pulse width generator 42. This generator is triggered by the pulse produced from clock 37 and delayed at 43. The output of generator 42 is illustrated in FIGURE 3B and comprises a gating pulse of time duration equal to or greater than the time required for ring down of the L-C circuit (illustrated in FIGURE 3C). Reverse flow of current through the coil 31 is by way of diode 44.

After the end of ring down of the L-C circuit, the motor 35 is actuated to move the belt 33 to position a new sample adjacent the coil 31. The motor 35 is actuated by a pulse produced by pulse width generator 45 and illustrated in FIGURE 3D. Pulse width generator 45 in turn is actuated by the output of electronic clock 37 delayed by circuit 46.

As mentioned previously, magnetization of the magnetic sample occurs within a short period of time whereby anhysteretic remanent magnetism will be imparted to the sample while the drill pipe is rotating. The time of magnetization is determined by the values chosen for capacitor 30 and coil 31.

In the above description, a rotational switch 22 was disclosed as employed for activating the instrumentation upon drilling. Referring to FIGURE 1, this rotation switch may comprise a coil 50 wound upon a core 51 secured to the walls of the sealed container 10 and between container 10 and casing 12, as disclosed in copending United States application entitled, Borehole Rotational Switching System, by James H. Sexton and Bobbie J. Patton, filed Feb. 23, 1966, Ser. No. 529,364, and assigned to the same assignee as the present application. Upon rotation of the casing 10, the coil 50 is rotated in the earth's magnetic field for the production of an alternating signal whose frequency and peak-to-peak amplitude are dependent upon the frequency of rotation of the casing. The output of the coil is applied to a discriminator 52 which employs the coil signal amplitude and coil signal frequency for producing a control signal for activating the instrumentation only when the rotational frequency of the casing 10 falls within a given frequency range. The discriminator 52 disclosed in the above-identified application comprises a low-pass amplifier, a rectifying and integrating circuit, and a voltage discriminator, the output of which is applied to a silicon controlled switch coupled to a load circuit. The low-pass amplifier passes only signal frequencies below a given frequency. The output of the amplifier is applied to the rectifying and integrating circuit for the production of a DC signal having an amplitude proportional to the frequency of rotation. This DC signal then is applied to the voltage discriminator which produces an output only when the DC signal rises above a given threshold. Thus, a control signal is produced by the voltage discriminator only when the frequency of rotation of the casing falls within the desired rotational frequency range, the lower limit of which may begin at about one-half cycle per second.

In the embodiments of FIGURES 1 and 2, the synthetic sample 15 and samples 32 may be constructed of materials such as cobalt magnetic steel, carbon steel, solid magnetite, or crushed and pressed magnetite, etc. The container 10 and the casing 12 in the vicinity of the sample 15 are made of nonmagnetic material. In the vicinity of the coil 50, the container 10 and casing 12 are made of magnetic material.

Although a rotational switch 22 was disclosed for initiating switching of the capacitor in the L-C resonant circuit, it is to be understood that a preset timer alone may be employed for initiating switching in the embodiments of FIGURE 1 and FIGURE 2. In the embodiment of FIGURE 1, the timer would produce a single initiating pulse at a known time and in the embodiment of FIGURE 2 it would produce periodic initiating pulses at known times. In the embodiment of FIGURE 2, the alignment of the belt 33 and hence of the samples 32 is known with respect to the drill pipe casing. Thus, sufficient information is obtainable to determine the orientation of the casing within the borehole at different depths.

Although the above description relates to the application of anhysteretic remanent magnetism to the synthetic substance for tool orientation purposes, it is to be understood that other types of remanent magnetism, dependent upon the earth's magnetic field, could be imparted instead for orientation purposes. For example, thermal remanent magnetism aligned in the direction of the earth's field could be imparted to a small sample by employing an electrically activated heating element. This technique would be useful in certain applications. More time would be required for imparting remanent magnetism to the sample; however, the technique would have advantages in that the driving energy would be unbiased magnetically.

Having described the invention, it will be understood that modifications may suggest themselves to those skilled in the art, and it is intended to cover all those that fall within the scope of the appended claims.

What is claimed is:

1. A method of recording the orientation of a borehole tool when in a borehole comprising the steps of:
prior to the insertion of said tool into said borehole, locating a synthetic substance of magnetic material therein in a known alignment,
inserting said tool into said borehole to carry out desired operations, and
while said tool is located in said borehole, imparting to said substance remanent magnetism aligned in the direction of the earth's magnetic field.

2. The method of claim 1 wherein:
the direction of said remanent magnetism imparted to said substance is measured to obtain an indication of the orientation of said tool while in said borehole.

3. The method of claim 1 wherein:
anhysteretic remanent magnetism is imparted to said substance.

4. The method of claim 1 wherein:
thermal remanent magnetism is imparted to said substance.

5. The method of claim 1 comprising the steps of:
removing said tool from said borehole after said operations are carried out,
removing said magnetic substance from said tool,
measuring the direction of said remanent magnetism imparted to said substance to obtain an indication of the orientation of said tool while in said borehole.

6. A system for recording the orientation of a tool employed for carrying out operations in a remote location in the presence of the earth's magnetic field, the combination therewith of:
a synthetic sample of magnetic material located in said tool in a closed section of said tool in a known alignment therewith, and
means for imparting to said sample remanent magnetism aligned in the direction of the earth's magnetic field for recording the orientation of said tool while in said remote location.

7. The combination of claim 6 wherein said tool comprises:
a borehole tool for insertion into a borehole.

8. The combination of claim 6 wherein:
said last-named means comprises means for producing and imparting an alternating and decaying magnetic field to said sample in the presence of the earth's magnetic field whereby anhysteretic remanent magnetization aligned in the direction of the earth's magnetic field is imparted to said sample.

9. The combination of claim 6 wherein:
said tool comprises a rotatable casing having a drill bit coupled thereto for insertion into a borehole,
said sample being secured within said casing in a known alignment,
said last-named means being capable of imparting directionally aligned anhysteretic remanent magnetism to said sample while said casing is rotating.

References Cited

UNITED STATES PATENTS

| | | |
|---|---|---|
| 2,203,730 | 6/1940 | Johnson. |
| 2,292,838 | 8/1942 | Jones _____ 175—44 X |
| 2,709,069 | 5/1955 | Boucher _____ 175—44 |
| 2,810,548 | 10/1957 | Martinez _____ 175—44 |
| 3,088,528 | 5/1963 | Patton et al. _____ 175—44 |
| 3,209,823 | 10/1965 | Winkel _____ 175—44 X |

CHARLES E. O'CONNELL, *Primary Examiner.*

I. A. CALVERT, *Assistant Examiner.*